United States Patent
Baldwin et al.

(10) Patent No.: US 6,613,392 B2
(45) Date of Patent: Sep. 2, 2003

(54) METHOD FOR MAKING A FIBER REINFORCED COMPOSITE ARTICLE AND PRODUCT

(75) Inventors: Jack Wilbur Baldwin, West Chester, OH (US); John Andrew Ravenhall, Hamilton, OH (US); Bruce Clark Busbey, Loveland, OH (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 09/907,982

(22) Filed: Jul. 18, 2001

(65) Prior Publication Data

US 2003/0017053 A1 Jan. 23, 2003

(51) Int. Cl.$^7$ .............................. B05D 1/18; B05D 3/02
(52) U.S. Cl. ................................ 427/430.1; 427/385.5
(58) Field of Search ........................... 427/430.1, 385.5

(56) References Cited

U.S. PATENT DOCUMENTS

| | | | |
|---|---|---|---|
| 3,834,832 A | * 9/1974 | Mallinder et al. | 416/230 |
| 3,892,612 A | 7/1975 | Carlson et al. | 156/150 |
| 4,022,547 A | 5/1977 | Stanley | 416/230 |
| 4,622,091 A | * 11/1986 | Letterman | 156/286 |
| 4,622,254 A | * 11/1986 | Nishimura et al. | 428/102 |
| 5,279,892 A | 1/1994 | Baldwin et al. | 428/257 |
| 5,308,228 A | 5/1994 | Benoit et al. | 416/230 |
| 5,375,978 A | 12/1994 | Evans et al. | 416/230 |
| 6,099,906 A | * 8/2000 | Palmer et al. | 427/296 |

* cited by examiner

Primary Examiner—Michael Barr
(74) Attorney, Agent, or Firm—Nathan D. Herkamp; Lee H. Sachs

(57) ABSTRACT

A fiber reinforced composite article is made by providing a plurality of layers of first, substantially dry, unimpregnated reinforcing fibers, sometimes called in-plane fibers. Such layers are stacked into a preform of a stack of layers. While in the dry, unimpregnated condition, a plurality of spaced apart second reinforcing members are inserted into the preform at an angle, for example transversely, to the stack of layers. In this condition, the preform is impregnated with a matrix about the first reinforcing fibers and the second reinforcing members. The article product comprises the plurality of stacked layers of the first reinforcing fibers and the plurality of the spaced apart second reinforcing members disposed beside or adjacent the first reinforcing fibers, with a substantially solid matrix disposed about the reinforcing fibers and members.

7 Claims, 3 Drawing Sheets

METHOD FOR MAKING A FIBER REINFORCED COMPOSITE ARTICLE AND PRODUCT

BACKGROUND OF THE INVENTION

This invention relates to a fiber reinforced composite article and its manufacture. More particularly, it relates to a fiber reinforced composite article such as a composite blading member including an airfoil, the article including generally transverse or angled reinforcing members.

Components for sections of gas turbine engines, for example a fan and/or a compressor, operating at relatively lower temperatures than sections downstream of the combustion section have been made of resin matrix composites including stacked, laminated layers. Generally such primarily non-metallic composite structures, which replaced heavier predominantly metal structures, include superimposed layers, sometimes called plies, reinforced with fibers substantially in the plane of the layer. As used herein, fibers include within it meaning filaments in a variety of configurations and lay-up directions, sometimes about a core and/or with local metal reinforcement or surface shielding. For elevated temperature applications, a variety of materials are used for such fibers, including carbon, graphite, glass, metals (forms of which sometimes are called boron fibers), etc., as is well known in the art. Typical examples of such components made primarily of non-metallic composites are reported in such U.S. Pat. No. 3,892,612—Carlson et al. (patented Jul. 1, 1975); U.S. Pat. No. 4,022,547—Stanley (patented May 10, 1977); U.S. Pat. No. 5,279,892—Baldwin et al. (patented Jan. 18, 1994); U.S. Pat. No. 5,308,228—Benoit et al. (patented May 3, 1994); and U.S. Pat. No. 5,375,978—Evans et al. (patented Dec. 27, 1994).

As has been discussed in detail in such patents as the above-identified Evans et al. patent, such non-metallic composites in an aircraft gas turbine engine are subject to damage from ingestion into the engine and impact on components of foreign objects. Such objects can be airborne or drawn into the engine inlet. These include various types and sizes of birds as well as inanimate objects such as hailstones, sand, land ice, and runway debris. Impact damage to the airfoil of blading members, including fan and compressor blades, as well as damage to strut type members in the air stream, has been observed to cause loss of material and/or delamination of the stacked layers. Such a condition in a rotating blade can cause the engine to become unbalanced resulting in potentially severe, detrimental vibration.

The above identified and other prior art have reported various arrangements and structures to avoid such material loss and/or delamination of layers. Some arrangements, for example U.S. Pat. No. 3,834,832—Mallinder et al. (patented Sep. 10, 1974) and the above-identified Benoit et al. patent, include use of seams or fastening devices disposed transversely through an at least partially solidified, reinforced resin matrix that fixes reinforcing fibers in a position. Their purpose is to avoid delamination of laminated composite structures using ordinary commercial resin systems as the composite matrix. It has been observed, however, that disposition of such transverse reinforcement through a generally solidified or at least partially cured resin reinforced layer or preform of an article, with reinforcing fibers held by a resin in a fixed position, can fracture, tear or otherwise damage the fibers reinforcing the layer. Such damage can reduce the operating integrity and life of a composite article.

BRIEF SUMMARY OF THE INVENTION

The present invention, in one form, provides a method for making a fiber reinforced composite article comprising a plurality of stacked layers and including additional reinforcing members disposed at an angle, for example generally transverse, to planes of the stacked layers without damage to in-plane fibers reinforcing the layers. The method comprises providing a plurality of layers of first, substantially dry, unimpregnated reinforcing fibers, herein sometimes called in-plane fibers. In a preferred form, such first reinforcing fibers generally are aligned with one another in the layers. Such layers are stacked generally upon one another into a preform of a stack of layers. While in the dry, unimpregnated condition, a plurality of spaced apart additional or second reinforcing members is inserted into the preform at an angle to the stack of the layers. One preferred example is an angle generally transverse to such stack of layers of the preform. Then the preform is impregnated with a matrix about the first reinforcing fibers and the second reinforcing members.

In another form, the present invention provides a fiber reinforced composite article. Such article includes a plurality of stacked layers of first reinforcing fibers and a plurality of second reinforcing members disposed into the article at an angle to the stack of layers. The second reinforcing members are disposed beside or adjacent to the first reinforcing fibers. A substantially solid matrix is disposed about the first reinforcing fibers and second reinforcing members.

DETAILED DESCRIPTION OF THE INVENTION

Disposition of in-plane fiber reinforced, stacked layers within a cured resin matrix has provided strength and an amount of resistance to material loss in such articles as gas turbine engine blading members. A typical example is an aircraft gas turbine engine fan blade. Such composite structure is lighter in weight than a comparable metal article. Therefore, use of the reinforced composite article has contributed to improvement in operation of a gas turbine engine. However, because such a structure includes stacked layers or laminations, an impact on the article, typically on the airfoil of a blading member, can cause layers to separate or delaminate.

Figure 1:
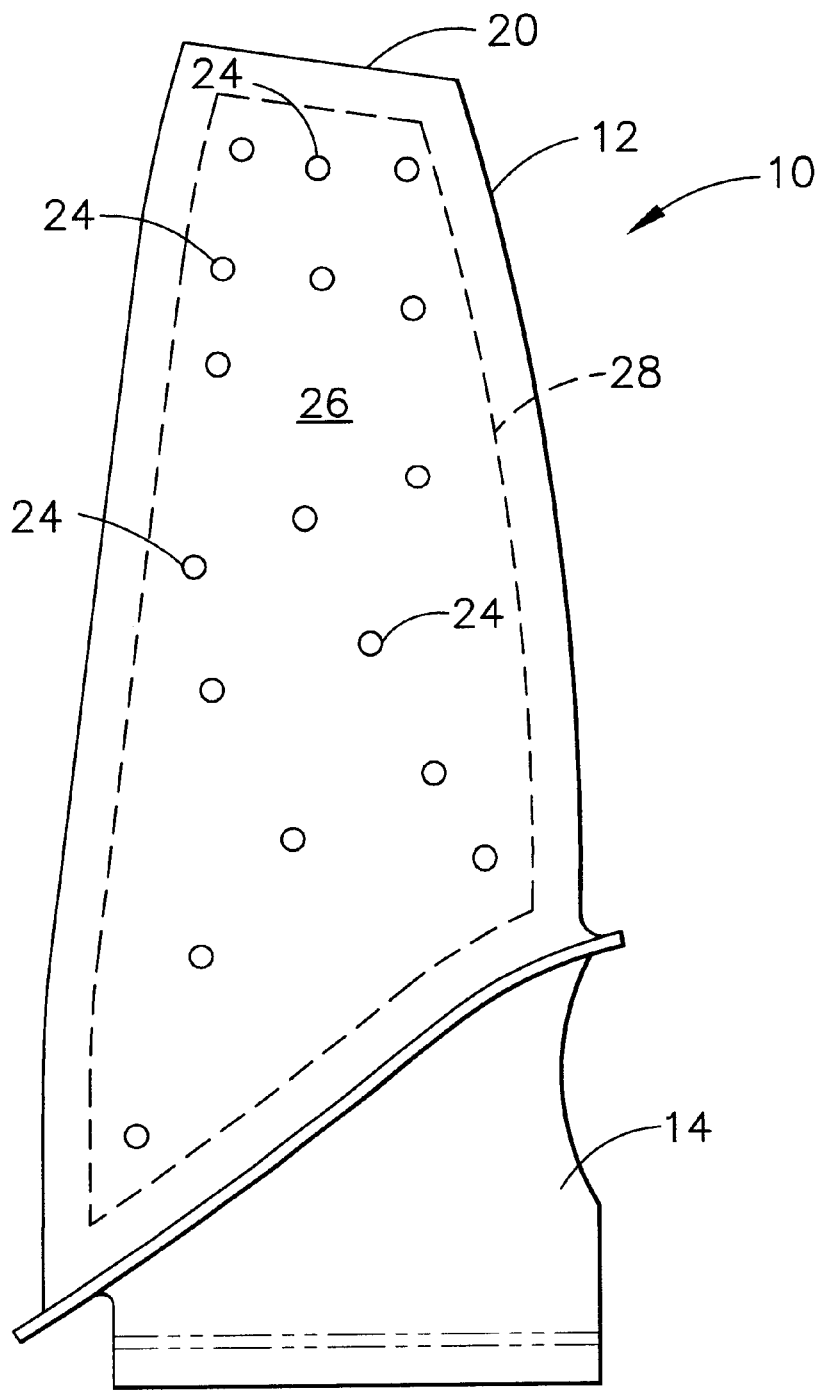
FIG. 1 is a diagrammatic side view of a turbine engine blading member, such as a fan blade, including a fiber reinforced composite airfoil.

As was mentioned above, prior additional reinforcement of the layers has been disposed generally transverse to the layers of the stacked composite article. For example, such arrangements are described in the above-identified Mallinder et al. and Benoit et al patents. However, as described in those patents, such additional, generally transverse reinforcement or fastening devices, such as stitches, seams, pins, and staples, has been disposed into the stacked layers while the layers and their reinforcing fibers are in a substantially fixed, immobile position. Such fixed relationship was established at least by a partially cured or pre-impregnated resin disposed about the generally in-plane reinforcing fibers in the layer, prior to introduction of the additional reinforcement. It has been observed that disposing such additional, generally transverse reinforcement into such a fixed structure can result in abrading, tearing, or complete fracture of the relatively immobile fiber reinforcement of the layers of the composite structure. Damage of that nature can adversely affect the strength and/or operating life of a composite article including torn or damaged fiber reinforcement within at least one lamination. Forms of the present invention provide a stacked layered, fiber reinforced composite article, and method for making the article, with angled, for example generally transverse, reinforcement which avoids damage to in-plane type reinforcing fibers. This is accomplished according to forms of the present invention by disposing the angled reinforcing fibers beside, meaning not in damaging interference with, the in-plane reinforcing fibers, avoiding at least partial penetration into or through in-plane fibers reinforcing the layers The present invention will be more fully understood by reference to the drawings. FIG. 1 is a diagrammatic side view of a typical gas turbine engine composite, laminated, fiber reinforced fan blade shown generally at 10 including an airfoil 12, a base 14, and an airfoil tip 20. Airfoil 12 includes a thickness 22, shown in more detail in FIG. 2, and which can vary across airfoil 12 as a function of its design. Airfoil 12 includes additional or second reinforcement in the form of reinforcing pins, some of which are shown at 24, disposed in a selected pattern or arrangement within region 26 of airfoil 12 included within broken line 28.

Figure 2:
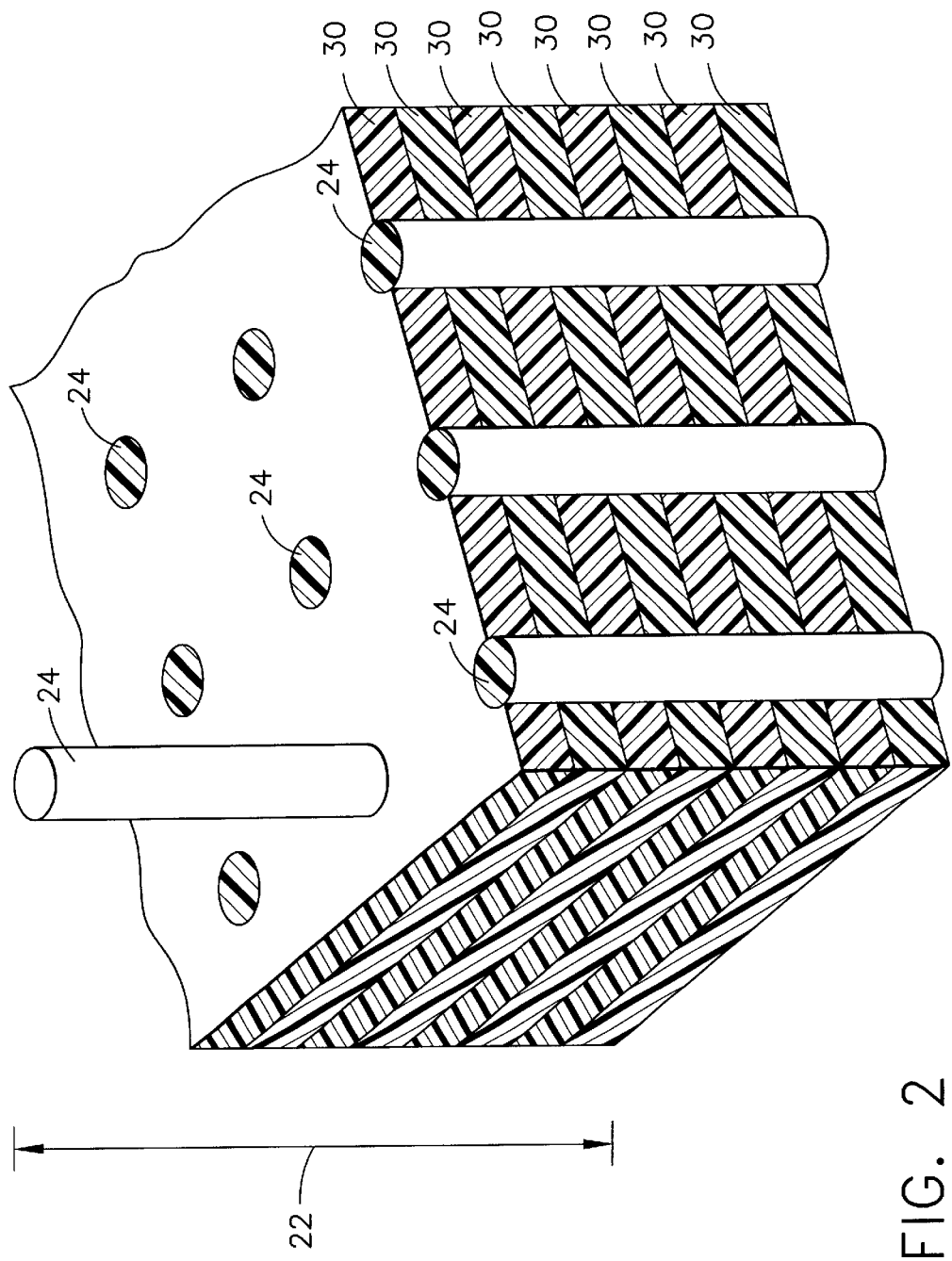
FIG. 2 is an enlarged, diagrammatic, fragmentary, partially sectional view of a portion through a thickness of the airfoil of the composite airfoil of FIG. 1 showing stacked, fiber reinforced layers and reinforcing members generally transverse to the layers.

FIG. 2 is an enlarged, fragmentary, partially sectional view through a portion of thickness 22 of airfoil 12 within region 26. Reinforcing pins 24, one shown as protruding from the fragmentary section, are disposed within and, in this example, substantially transversely to a plurality of typical stacked, reinforcing fiber planes or layers 30, sometimes called in-plane fibers, in airfoil 12. In the embodiment of FIG. 2, layers 30 are fiber reinforced composite layers impregnated with a resin.

Figure 3:
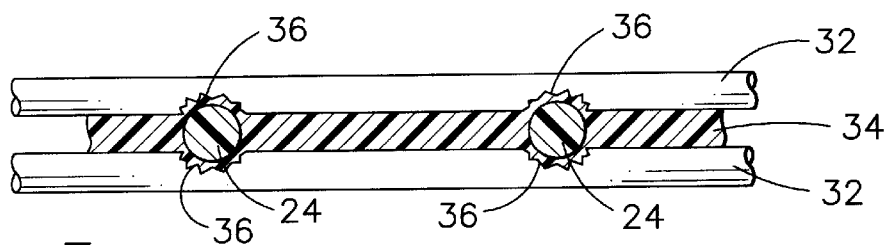
FIGS. 3 and 4 are diagrammatic, fragmentary sectional views of prior art arrangements of reinforcing members within a fiber reinforced, layered structure.
Figure 4:
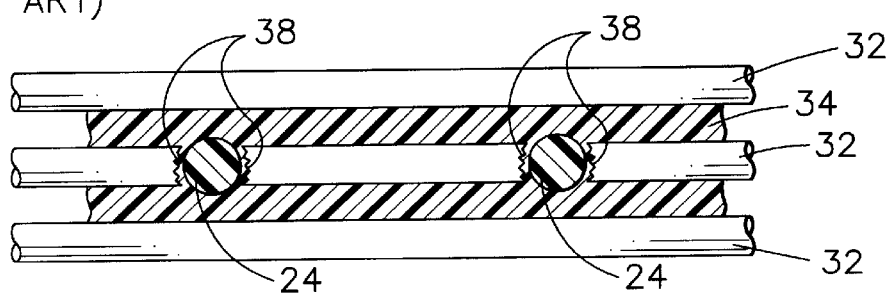

As was mentioned above, prior publications have shown such transverse reinforcement disposed in the airfoil of a blading member. FIGS. 3 and 4 are typical diagrammatic, fragmentary sectional representations of prior art arrangements. In each prior arrangement, additional reinforcement such as pins 24 were introduced transversely to in-plane layer reinforcing fibers 32 into a substantially fixed structure: fibers 32 were held in a substantially fixed, immobile position by at least partially cured matrix resin 34. As additional reinforcement members such as stitches, staples, or pins 24 were introduced into such a fixed structure, a variety of detrimental or damaging interference conditions occurred between fixed in-plane fibers 32 and moving reinforcing members or pins 24. Some of such interference resulted in tearing or abrading of fibers 32, for example as shown diagrammatically at 36 in FIG. 3. Other types of interference resulted in complete or virtual fracture or separation of in-plane reinforcing fiber 32, for example as shown diagrammatically at 38 in FIG. 4. Such detrimental, damaging interference conditions reduced the strength and operating life of the article.

Figure 5:
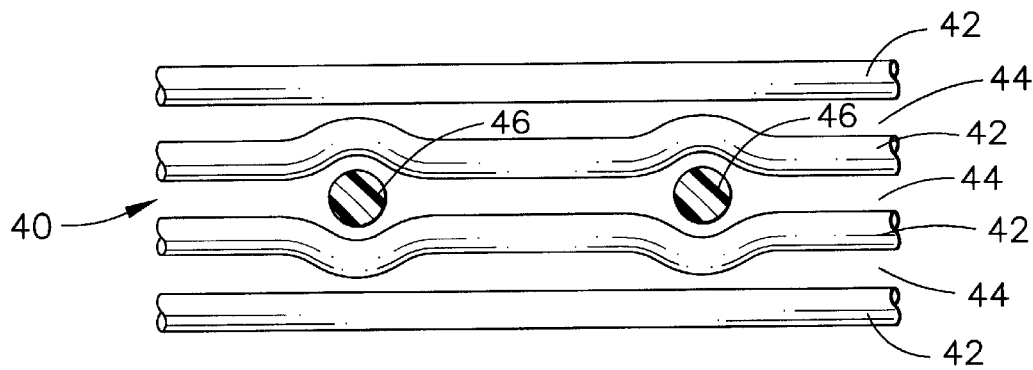
FIG. 5 is a diagrammatic, fragmentary, partially sectional view of an arrangement of layers and reinforcing members in the practice of a form of the present invention.

Forms of the present invention avoid occurrence of such detrimental, damaging interference conditions in a fiber reinforced composite article comprising a plurality of stacked layers having in-plane fiber reinforcement, for example in a first direction, further reinforced with a plurality of additional reinforcing members disposed at an angle to the stacked layers, for example in a second direction. In the practice of a form of the method of the present invention, a plurality of stacked layers of fibers, similar to layers 30 in FIG. 2, generally define a preform shown generally at 40 in the diagrammatic, fragmentary, partially sectional view of FIG. 5. In the embodiment of FIG. 5, each layer or plane of fibers in preform 40 includes first, substantially dry, unimpregnated reinforcing in-plane fibers 42 disposed generally in each layer of preform 40. In a preferred form, fibers 42 substantially are aligned with one another in the layer.

The in-plane fibers thus used in the present invention are defined herein to be in a dry, unimpregnated condition in that they are not impregnated with a resin that is in a partially cured, prepreg condition or in the filly cured condition. However, in some examples of practice of the present invention, individual in-plane fibers can include a lightly tacky surface material that enables the individual fibers to maintain a position or relationship with adjoining in-plane fibers in a layer. Nevertheless, such tacky condition does not inhibit individual fibers from being moved away from one another or from another member applying a force toward the in-plane fiber. For example, such a moving force can result from an angled reinforcing member introduced into the type of layered preform described above.

While fibers 42 are in the dry, unimpregnated condition and relationship shown in FIG. 5, including voids or spaces 44 between adjacent fibers 42, a plurality of additional or second reinforcing members 46 are inserted into preform 40. Reinforcing members 46, herein conveniently called pins, can be in the form of a unitary structure such as a single rod or fiber; but preferably member 46 is in the form of a bundle of fibers, sometimes referred to as filaments. In a preferred form, in-plane fibers 42 as well as reinforcing members 46 are of at least one material selected from carbon, graphite, glass, and metal, one example of which is referred to in the art as boron fibers. A plurality of second reinforcing members 46 were inserted at an angle, in this example substantially transversely as shown in FIG. 2, to the stack of layers 30 of in-plane reinforcing fibers 42. In the event members 46 contact in-plane fibers 42, loosely held fibers 42 were moved away from or beside members 46. Such free movement capability enables avoiding detrimental damage, for example abrasion, cracking, tearing, or completely fracturing, to in-plane reinforcing fibers 42.

Figure 6:
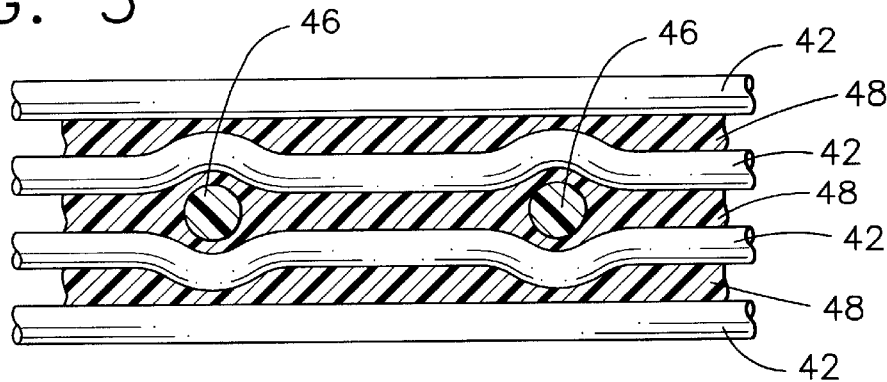
FIG. 6 is a diagrammatic, fragmentary, partially sectional view of a form of the article of the present invention showing the disposition of the stacked layers, the reinforcing members, and the fixed matrix.

After reinforcing members 46 had been inserted between dry, unimpregnated in-plane reinforcing fibers 42, a matrix 48, for example a commercially available epoxy resin, was disposed to impregnate, for example as by injection, preform 40 as shown in the diagrammatic, fragmentary sectional view of FIG. 6. In this embodiment, matrix resin 48 was disposed in voids 44 about the first, in-plane reinforcing fibers 42 and the second reinforcing members 46. Thereafter, the matrix resin in the impregnated preform was cured as practiced in the art to provide a fiber reinforced composite article.

During one series of evaluations of the present invention, a plurality of shaped layers of dry, unimpregnated, substantially unidirectionally aligned carbon fiber bundles, commercially available as IM-7 12K tow tapes from Hexel Company, were used as the first, in-plane reinforcing fibers disposed in a first direction. The layers of in-plane carbon fibers were disposed in a stack as layers of a preform in the cavity of a commercial resin transfer mold, with typical amounts of intermediate wicking felt as used in the art. The mold cavity was in the shape of a turbine engine blade including an airfoil, similar to that shown in FIG. 1, and included typical resin ports and vents. The preform and its layers then were inspected for any detrimental alignment conditions, such as wrinkling. Any such conditions were removed by redraping or smoothing the individual layers while the preform was in the dry, unimpregnated state.

With the layers of the preform in the mold cavity and before closing the mold for matrix resin injection, a plurality of dry, spaced apart bundles of carbon fibers were provided as the second, additional reinforcing members. Various forms and types of such bundles of fibers commercially are available, for example from prepreg manufacturers. Each such bundle in this example was about 0.020" in general diameter. The bundles were disposed into the preform in a second direction at an angle, in this example substantially transversely, to the in-plane first direction of the first reinforcing fibers in a selected region of the airfoil, for example as shown by region 26 in FIG. 1. The spaced-apart bundles were inserted into the preform by holding the bundles at an appropriate angle to the surface of the preform to be penetrated. Then the bundles were inserted into the preform. In one example, each bundle first was placed inside a hollow needle. Then the needle was driven into the preform. When the needle was retracted, it left the bundle in the preform.

After the substantially transverse bundles were inserted, the mold cavity was closed and a vacuum was provided in the cavity to remove ambient air from the cavity and from about the preform including its reinforcing members. Then an ordinary, commercially available curable epoxy resin was injected into the mold cavity about the stacked layers and the reinforcing fibers and members, wetting and saturating the preform including the reinforcements with the resin. In this example, the epoxy resin used was commercially available as Dow Chemical TACTIX 123 epoxy resin system. Curing of the resin was conducted at a temperature of about 350° F. for about 120 minutes before the mold was cooled then opened and the contents of the mold removed.

The resulting article was a near net shape molded substantially solid epoxy resin matrix reinforced, laminated composite article including an airfoil and a base. The airfoil included stacked layers of in-plane carbon fiber reinforcement and angled carbon fiber bundle reinforcement. Cross sectional inspection of the airfoil showed that the angled, second reinforcement had avoided detrimental interference with the in-plane reinforcing fibers in a structure similar to that shown in FIG. 6.

The present invention has been described in connection with specific examples and combinations of materials and structures. However, it should be understood that they are intended to be typical of rather than in any way limiting on the scope of the invention. Those skilled in the various arts involved with the methods, materials and structures will understand that the present invention is capable of variations and modifications without departing from the scope of the appended claims.

What is claimed is:

1. In a method for making a fiber reinforced composite article comprising providing a plurality of layers of substantially dry, unimpregnated reinforcing fibers;

stacking the layers generally one upon another into a preform of a stack of layers;

while in the substantially dry, unimpregnated condition, inserting a reinforcing member into the preform at an angle to the stack of layers;

impregnating the preform with a matrix about the reinforcing fibers and the reinforcing member; and then co-curing the reinforcing fibers, the reinforcing member and the matrix;

the steps of:
providing the reinforcing member as a plurality of individual reinforcing pins each comprising a bundles of rods; and,
inserting the plurality of individual reinforcing pins spaced apart and unconnected into the preform.

2. The method of claim 1 in which:

the reinforcing fibers and the reinforcing pins comprise at least one material selected from the group consisting of carbon, graphite, glass, and metal; and, the matrix is a curable resin.

3. The method of claim 1 in which the reinforcing pins extend substantially through the plurality layers of the preform.

4. The method of claim 1 in which the reinforcing fibers in a layer substantially are aligned with one another.

5. In the method of claim 1 for making at least an airfoil of a turbine engine blading member comprising providing a plurality of layers of substantially dry, unimpregnated reinforcing fibers comprising at least one material selected from the group consisting of carbon, graphite, glass, and metal;

stacking the layers generally one upon another into a preform of a stack of layers;

while in the substantially dry, unimpregnated condition, inserting a reinforcing member into the preform at an angle to the stack of layers;

impregnating the preform with a matrix of a curable resin about the reinforcing fibers and the reinforcing member; and then, co-curing the reinforcing fibers, the reinforcing member and the matrix;

the steps of:
providing the reinforcing member as a plurality of individual reinforcing pins each comprising a bundle of rods of at least one material selected from the group consisting of carbon, graphite, glass and metal; and,
inserting the plurality of individual reinforcing pins spaced apart and unconnected into the preform.

6. The method of claim 5 in which the reinforcing fibers substantially are aligned with one another.

7. The method of claim 5 in which:

each individual reinforcing pin, prior to inserting into the preform, is placed inside a hollow needle;

the needle is driven into the preform; and, the needle is retracted from the preform and the reinforcing pin, leaving the reinforcing pin in the preform.

* * * * *